US012100573B2

(12) United States Patent
Watanabe et al.

(10) Patent No.: US 12,100,573 B2
(45) **Date of Patent: *Sep. 24, 2024**

(54) X-RAY TUBE DEVICE

(71) Applicant: CANON ELECTRON TUBES & DEVICES CO., LTD., Otawara (JP)

(72) Inventors: Toshimi Watanabe, Yaita (JP); Hirobumi Yoshizawa, Sakura (JP); Junki Sone, Nasushiobara (JP)

(73) Assignee: CANON ELECTRON TUBES & DEVICES CO., LTD., Otawara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,436

(22) Filed: Mar. 11, 2022

(65) Prior Publication Data

US 2022/0199348 A1 Jun. 23, 2022

Related U.S. Application Data

(63) Continuation of application No. PCT/JP2020/003100, filed on Jan. 29, 2020.

(30) Foreign Application Priority Data

Sep. 11, 2019 (JP) ................................ 2019-165555

(51) Int. Cl.
*H01J 35/12* (2006.01)
*H01J 35/06* (2006.01)

(52) U.S. Cl.
CPC ............. *H01J 35/13* (2019.05); *H01J 35/064* (2019.05); *H01J 2235/1204* (2013.01); *H01J 2235/1233* (2013.01); *H01J 2235/1262* (2013.01)

(58) Field of Classification Search
CPC ............... H01J 35/13; H01J 2235/1233; H01J 2235/1262; H01J 2235/1204
See application file for complete search history.

(56) References Cited

U.S. PATENT DOCUMENTS 4,439,870 A * 3/1984 Poulsen .................. H01J 35/13 378/143
11,152,182 B2 * 10/2021 Watanabe ............... H01J 35/13
(Continued)

FOREIGN PATENT DOCUMENTS

JP 06-162974 A 6/1994
JP 2004-309465 11/2004

OTHER PUBLICATIONS

Lindstedt, Matt, "Hard Gold Plating vs. Soft Gold Plating", (Oct. 1, 2018), from the Internet <<https://www.pfonline.com/articles/hard-gold-plating-vs-soft-gold-plating>>. (Year: 2018).*
(Continued)

*Primary Examiner* — Chih-Cheng Kao
(74) *Attorney, Agent, or Firm* — Oblon, McClelland, Maier & Neustadt, L.L.P.

(57) ABSTRACT

According to one embodiment, an X-ray tube device includes a cathode which emits electrons, an anode target which generates X-rays when the electrons emitted from the cathode collide therewith, a first tube portion, a second tube portion which forms a flow path of a coolant together with the first tube portion, and a protective film. The protective film covers an inner surface of the first tube portion, and is formed of hard gold.

2 Claims, 2 Drawing Sheets

(56) References Cited

U.S. PATENT DOCUMENTS

| | | | | |
|---|---|---|---|---|
| 2002/0097838 | A1 * | 7/2002 | Saito | H01J 35/107 378/141 |
| 2018/0014881 | A1 | 1/2018 | Leitold et al. | |
| 2019/0096625 | A1 | 3/2019 | Heinke et al. | |

OTHER PUBLICATIONS

International Search Report issued Mar. 24, 2020 in PCT/JP2020/003100 filed on Jan. 29, 2020, 2 pages.
Chinese Office Action issued Oct. 27, 2023, in Chinese Patent Application No. 202080063068.8, therein 15 pages.
Liu, Z.W., "Research Progress on Electrodeposition of Hard Gold Layer", Planting and Finishing (vol. 33, No. 7, Serial No. 220), Jul. 2011, pp. 13-17 & 46.
Office Action mailed Apr. 16, 2024 in Chinese Application No. 202080063068.8 filed Jan. 29, 2020, w/English translation, 16 pages.
Teruo Sakamoto, "Electronic Metal Materials Selection Guide", 1st ed., Metallurgical Industry Press, Mar. 1987, pp. 220-221.
Office Action mailed Jun. 18, 2024 in Korean Application No. 10-2022-7005360 filed Jan. 29, 2020 (w/English translation).

* cited by examiner

X-RAY TUBE DEVICE

CROSS-REFERENCE TO RELATED APPLICATIONS

This application is a Continuation Applications of PCT Application No. PCT/JP2020/003100, filed Jan. 29, 2020 and based upon and claiming the benefit of priority from Japanese Patent Application No. 2019-165555, filed Sep. 11, 2019, the entire contents of all of which are incorporated herein by reference.

FIELD

Embodiments described herein relate generally to an X-ray tube device.

BACKGROUND

An X-ray tube device used for X-ray fluorescence analysis includes a cathode, an anode target, a cooling pipe, a water conducting pipe, and a joint connection portion connecting the water conducting pipe and the cooling pipe (hereinafter referred to as a joint). The X-ray tube device comprises a flow path of a coolant for cooling the anode target, which is composed of the cooling pipe, the water conducting pipe, the joint and other structures. The anode target is joined at a predetermined position outside the structures constituting this flow path. The water conducting pipe and the cooling pipe each are connected to the joint. The water conducting pipe is composed of, for example, an inner pipe disposed inside and an outer pipe disposed outside. A tip nozzle portion of the inner pipe is installed to emit the coolant in a direction of where the anode target is installed. In this case, the cooling pipe is composed of a first cooling pipe connected to the inner pipe via the joint and a second cooling pipe connected to the outer pipe via the joint. In this X-ray tube device, the coolant passes through the first cooling pipe and is sent to the inner pipe via the joint, and passes through the flow path between the inner pipe and the outer pipe and is discharged from the second cooling pipe via the joint.

In the X-ray tube device, when electrons emitted from the cathode collide with the anode target, the anode target and its surrounding part become hot. The anode target and its surrounding part are cooled by the coolant flowing through the flow path formed in the vicinity of them. On the wall surface of the flow path in the vicinity of where the anode target is installed in the flow path through which the coolant flows, subcooled boiling of the coolant, cavitation in the flow of the coolant, and the like may occur. These subcooled boiling, cavitation and the like cause bubbles in the flow path in the vicinity of where the anode target is installed, that is, in the vicinity of the tip nozzle portion of the inner pipe.

DETAILED DESCRIPTION

Figure 1:
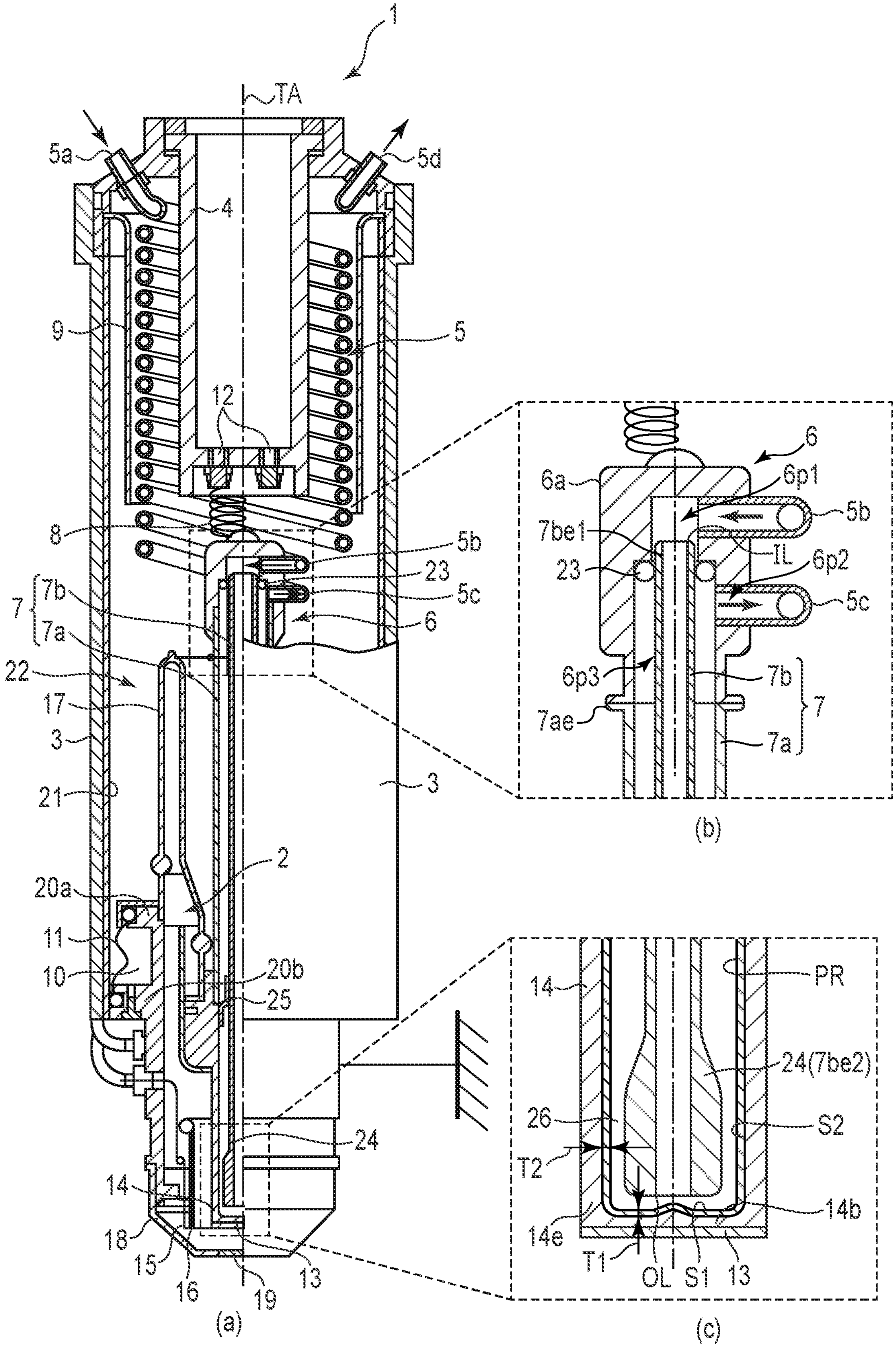
FIG. 1 is a cross-sectional view showing an X-ray tube device according to one embodiment.

In general, according to one embodiment, there is provided an X-ray tube device comprising: a cathode which emits electrons; an anode target which generates X-rays when the electrons emitted from the cathode collide therewith; a first tube portion having one end portion and another end portion including a bottom portion which is closed and joined to the anode target; a second tube portion located inside the first tube portion, having a first end portion where an inlet for taking in a coolant is formed and a second end portion which is opposed to the bottom portion and where an outlet for discharging the coolant to the bottom portion is formed, and forming a flow path of the coolant together with the first tube portion; and a protective film covering an inner surface of the first tube portion and formed of hard gold.

One embodiment will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, elements similar to those described in connection with preceding drawings are denoted by like reference numbers, and detailed description thereof is omitted unless necessary.

FIG. 1 is a cross-sectional view showing an X-ray tube device 1 according to one embodiment. FIG. 1 (*a*) is a cross-sectional view showing the entire X-ray tube device 1, FIG. 1 (*b*) is an enlarged partial cross-sectional view showing a part of the X-ray tube device 1, and FIG. 1 (*c*) is an enlarged partial cross-sectional view showing another part of the X-ray tube device 1 of the embodiment. FIG. 1 (*a*) shows a cross section of a part of the X-ray tube device 1 centered on a tube axis TA. A direction parallel to the tube axis TA is hereinafter referred to as an axial direction. With regard to the axial direction, a direction toward an X-ray tube 2 is referred to as a downward direction (lower side), and a direction opposite to the downward direction is referred to as an upward direction (upper side). In addition, a direction perpendicular to the tube axis TA is referred to as a radial direction.

As shown in FIG. 1, the X-ray tube device 1 comprises an X-ray tube 2, and a tube container 3 containing this X-ray tube 2. The X-ray tube device 1 further comprises a high-voltage receptacle 4 for inserting and connecting a high-voltage cable, a cooling pipe 5, a joint connection portion (hereinafter referred to simply as a joint) 6, a water conducting pipe 7, a conductor spring 8 which electrically connects the high-voltage receptacle 4 and the water conducting pipe 7, a cylindrical insulating cylinder 9 disposed outside the high-voltage receptacle 4, and a bellows 11 which isolates an adjustment space 10 and an internal space 22.

The high-voltage receptacle 4 is formed in a bottomed cylindrical shape having an open upper end portion and a closed lower end portion in order to connect the high-voltage cable. The high-voltage receptacle 4 is liquid-tightly disposed on the upper side of the tube container 3 described later with the tube axis TA as the central axis. The high-voltage receptacle 4 comprises a connection terminal 12 which penetrates from the inside to the outside bottom portion. The connection terminal 12 includes a bushing of an external electric circuit inserted into the high-voltage receptacle 4, and a terminal. The connection terminal 12 is connected to the joint 6 via the conductor spring 8.

The insulating cylinder 9 is formed of a substantially cylindrical insulator. The insulating cylinder 9 is structured such that insulating oil can circulate, although this is not shown in the drawing. The upper end portion of the insulating cylinder 9 is fixed to the inside of the tube container 3, for example.

The cooling pipe 5 is a conducting pipe through which a coolant, for example, pure water as a water-based coolant flows. The cooling pipe 5 is spirally disposed between the high-voltage receptacle 4 and the insulating cylinder 9. The cooling pipe 5 is composed of a first cooling pipe 5*b* comprising a water supply port 5*a* through which the coolant is supplied, and a second cooling pipe 5*c* comprising a discharge port 5*d* through which the coolant is discharged. In the first cooling pipe 5*b*, the water supply port 5*a* is connected to a circulation cooling device or the like (not shown) which is the supply source of the coolant, and an end portion on a side opposite to the water supply port 5*a* is connected to the joint 6. On the other hand, in the second cooling pipe 5*c*, the discharge port 5*d* is connected to the circulation cooling device or the like (not shown), and an end portion on a side opposite to the discharge port 5*d* is connected to the joint 6. Note that the cooling pipe 5 may not be spirally disposed.

The joint 6 is disposed in the central part of the X-ray tube device 1, for example, on the tube axis TA, and connects the cooling pipe 5 and the water conducting pipe V. The joint 6 has a main body 6*a* where three holes, that is, a first passage 6*p*1, a second passage 6*p*2 formed substantially parallel to the first passage 6*p*1, and a third passage 6*p*3 formed perpendicular to the first passage 6*p*1 and the second passage 6*p*2 are formed.

For example, as shown in FIG. 1 (*b*), the first passage 6*p*1 is formed to communicate from the side surface portion (outer peripheral portion) to the third passage 6*p*3 substantially perpendicularly to the tube axis TA in the upper part of the main body 6*a*. Similarly, the second passage 6*p*2 is formed to communicate from the side surface portion to the third passage 6*p*3 substantially perpendicularly to the tube axis TA in a part lower than the first passage 6*p*1 of the main body 6*a*. That is, the first and second passages 6*p*1 and 6*p*2 are open in a direction perpendicular to the tube axis TA in the side surface portion of the main body 6*a*. In addition, the first cooling pipe 5*b* is liquid-tightly connected to the first passage 6*p*1, and the second cooling pipe 5*c* is liquid-tightly connected to the second passage 6*p*2. The third passage 6*p*3 is formed to communicate from the lower end portion of the main body 6*a* to the first passage 6*p*1 along the tube axis TA, and has a step from a part leading to the second passage 6*p*2 to a part leading to the first passage 6*p*1. That is, the third passage 6*p*3 is open toward the lower part along the tube axis TA, and is formed such that the hole diameter of the part leading to the first passage 6*p*1 is less than the hole diameter of the part leading to the second passage 6*p*2. In the third passage 6*p*3, the part leading to the first passage 6*p*1 and having a small hole diameter is hereinafter referred to as a small-diameter portion, and the part leading to the second passage 6*p*2 and having a large hole diameter is hereinafter referred to as a large-diameter portion.

The water conducting pipe 7 includes a cylindrical outer pipe 7*a* and a cylindrical inner pipe 7*b* disposed inside the outer pipe 7*a*. In addition, the water conducting pipe 7 comprises an elastic member 23 and a support member 25 inside. The water conducting pipe (tube portion) 7 is disposed to extend along the axial direction, for example, the tube axis TA, and is connected to the lower part of the joint 6.

The outer pipe 7*a* is liquid-tightly joined to the lower part of the main body 6*a* of the joint 6 and the upper part of an anode block 14 described later. The inner diameter of the outer pipe 7*a* is substantially equal to the diameter of the small-diameter portion of the third passage 6*p*3.

The inner pipe 7*b* has an outer diameter less than the inner diameter of the outer pipe 7*a*. The inner pipe 7*b* is disposed to extend along the tube axis TA. In the inner pipe 7*b*, the upper end portion is fitted into the small-diameter portion of the third passage 6*p*3, the middle portion is supported by the support member 25, and the lower end portion is provided with a tip nozzle portion 24. The inner pipe 7*b* has an outer diameter substantially equal to the hole diameter of the first passage 6*p*1, and has a fitting gap having a predetermined tolerance between the inner pipe 7*b* and the first passage 6*p*1.

The shape of the elastic member 23 is, for example, an O-ring shape or a pipe shape. The cross-sectional shape of the elastic member 23 may be circular or quadrangle. The elastic member 23 is formed of a resinous rubber member. The elastic member 23 is disposed between the outer peripheral portion in the vicinity of the fitting portion of the inner pipe 7*b* and the large-diameter portion of the third passage 6*p*3 in the stepped part of the third passage 6*p*3. The thickness of the elastic member 23 is substantially equal to the width between the outer diameter of the inner pipe 7*b* and the diameter of the large-diameter portion of the third passage 6*p*3, or greater than this width. In addition, the elastic member 23 may be disposed in at least a part between the inner pipe 7*b* and the third passage 6*p*3 in the vicinity of the fitting portion of the inner pipe 7*b*.

The outer pipe 7*a* and the anode block 14 function as a first tube portion, and the first tube portion has one end portion Tae on the joint 6 side and another end portion 14*e* including a bottom portion 14*b* which is closed and joined to an anode target 13. The anode target 13 is located outside the anode block 14.

The inner pipe 7*b* functions as a second tube portion, and is located inside the outer pipe 7*a* and the anode block 14. The inner pipe 7*b* has a first end portion 7*be*1 and a second end portion 7*be*2, and forms the flow path of the coolant together with the first tube portion (outer pipe 7*a* and anode block 14). In the first end portion 7*be*1, an inlet IL through which the coolant is taken in is formed. The second end portion 7*be*2 corresponds to the tip nozzle portion 24, and is opposed to the bottom portion 14*b*. In the second end portion 7*be*2, an outlet OL through which the coolant is discharged to the bottom portion 14*b* is formed.

As shown in FIG. 1 (*c*), a protective film PR covers the inner surface of the anode block 14 (first tube portion). The inner surface of the anode block 14 has a bottom surface S1 on a side opposite to a side of the anode block 14 opposed to the anode target 13, and an inner peripheral surface S2 opposed to the tip nozzle portion 24 in the radial direction. The protective film PR continuously covers from the bottom surface S1 to the inner peripheral surface S2.

The protective film PR is formed of hard gold. Cobalt (Co) is used as an additive in the hard gold. The hard gold contains gold (Au) of greater than or equal to 99 wt % and cobalt of greater than 0 wt % but less than or equal to 1 wt %. In the present embodiment, the hard gold contains 0.3 wt % cobalt. The protective film PR is formed by a plating method, and is hard gold plating. The hardness of the protective film PR varies depending on a heat treatment temperature after a film of hard gold is formed on the inner surface of the anode block 14. The heat treatment temperature at which the protective film PR is formed is 700° in the present embodiment but is not limited to this temperature.

Here, the thickness of the protective film PR in a region opposed to the bottom surface S1 is T1, and the thickness of the protective film PR in a region opposed to the inner peripheral surface S2 is T2. In the present embodiment, the thickness T1 is in a range of 15 to 25 μm, and the thickness T2 is in a range of 25 to 35 μm. Although the thickness T2 tends to be greater than the thickness T1, the relationship between the thickness T1 and the thickness T2 is not limited to this relationship. For example, the thickness T1 may be greater than the thickness T2.

The protective film PR is disposed to prevent corrosion and erosion of the anode block 14 by the coolant. The protective film PR formed of hard gold has a thermal conductivity equal to the thermal conductivity of a protective film formed of soft gold. The hardness of the protective film PR formed of hard gold is substantially twice the hardness of a protective film formed of soft gold. Therefore, the protective film PR formed of hard gold has an excellent function in corrosion and erosion durability.

As shown in FIG. 1, the X-ray tube 2 comprises the anode target (anode) 13, the anode block 14, a cathode 15 which emits electrons, a Wehnelt electrode 16, a first vacuum envelope 17 and a second vacuum envelope 18. When the high-voltage cable is connected to the high-voltage receptacle 4, a high voltage (tube voltage) is applied between the anode target 13 and the cathode 15 described later.

The anode block 14 is formed in a bottomed cylindrical shape with the tube axis TA as the central axis. The lower end portion of the outer pipe 7*a* is fixed to the opening side of the anode block 14. The tip nozzle portion 24 of the inner pipe 7*b* is arranged inside the anode block 14. The coolant is emitted from this tip nozzle portion 24 toward the bottom portion 14*b* of the anode block 14 (or in the direction of where the anode target 13 is installed).

In the X-ray tube device 1, the joint 6, the water conducting pipe 7 and the anode block 14 described earlier constitute the flow path through which the coolant flows when they are assembled. Although the joint 6, the water conducting pipe 7 and the anode block 14 are described as separate bodies, they may all be formed as a single body or may be partially formed as a single body as long as they constitute the flow path through which the coolant flows. When the coolant circulates through the flow path composed of the joint 6, the water conducting pipe 7 and the anode block 14, and the cooling pipe 5, the insulating oil filling the internal space 22 described later, the anode target 13 and the like are cooled.

The anode target 13 is joined to the bottom portion 14*b* of the anode block 14. The anode target 13 generates X-rays when electrons collide therewith. At this time, the anode target 13 is heated by collision of electrodes, but is cooled by the coolant flowing through the flow path inside the anode block 14. Relatively, a positive voltage is applied to the anode target 13, and a negative voltage is applied to the cathode 15. For example, the cathode 15 is electrically grounded.

The cathode 15 is formed of a ring-shaped filament, and is disposed with a predetermined space outward in the radial direction from the anode target 13 (or the anode block 14). Electrons emitted from the cathode 15 cross the lower end portion of the Wehnelt electrode 16 described later, and collide with the anode target 13.

The Wehnelt electrode 16 is formed in a circular shape, and is disposed between the anode target 13 and the cathode 15. The Wehnelt electrode 16 focuses the electrodes emitted from the cathode 15 on the anode target 13.

The first vacuum envelope 17 is composed of an inner cylinder and an outer cylinder. In the first vacuum envelope 17, the upper end portions of the inner cylinder and the outer cylinder are joined together. The inner cylinder and the outer cylinder have a substantially cylindrical shape and are formed of, for example, a glass material or a ceramic material. In the first vacuum envelope 17, the lower end portion of the inner cylinder is vacuum-lightly connected to the anode block 14, and the lower end portion of the outer cylinder is vacuum-tightly connected to the wall portion of the X-ray tube 2 as a part of the wall surface of the X-ray tube 2.

The second vacuum envelope 18 is formed in a bottomed substantially cylindrical shape. The upper end portion of the second vacuum envelope 18 is vacuum-tightly connected to the wall portion of the X-ray tube as a part of the wall surface of the X-ray tube 2. The second vacuum envelope 18 is electrically grounded together with the tube container 3 described later. In the second vacuum envelope 18, an X-ray transmissive window (window portion) 19 is vacuum-tightly joined to an opening penetrating the vicinity of the center of the bottom portion. The X-ray transmissive window 19 transmits X-rays generated from the anode target 13 when electrons collide therewith, and emits the X-rays to the outside of the X-ray tube device 1. The X-ray transmissive window 19 is formed of an X-ray transmissive material, for example, a beryllium sheet. In addition, the X-ray tube 2 comprises a first convex portion 20*a* and a second convex portion 20*b* protruding outward in the radial direction on a part of the outer wall.

The tube container 3 is a sealed container which houses the respective parts of the X-ray tube device 1 inside. The tube container 3 is formed in a substantially cylindrical shape with the tube axis TA as the central axis. The tube container 3 is formed of, for example, a metal member. In addition, a lead plate 21 is internally attached to the inner wall of the tube container 3. The internal space 22 inside the tube container 3 (lead plate 21) is filled with insulating oil. Here, the internal space 22 is, for example, a space inside the tube container 3 and outside the X-ray tube 2 and the high-voltage receptacle 4 but other than the adjustment space 10.

The bellows 11 is disposed to isolate the internal space 22 and the adjustment space 10 in a predetermined part on the lower side of the tube container 3. In the bellows 11, one end portion is fixed to the first convex portion 20*a*, and another end portion is fixed to the second convex portion 20*b*. The bellows 11 is formed of a resinous elastic member, and absorbs expansion and contraction, etc., of the insulating oil by contraction and expansion of the adjustment space 10. The bellows 11 is a stretchable elastic member, for example, a rubber bellows (rubber film).

In the present embodiment, in the X-ray tube device 1, the coolant is taken in from the first cooling pipe 5*b*, and flows from the upper end portion into the inner pipe 7*b* via the first passage 6*p*1. The coolant flowing into the inner pipe 7*b* collides with the bottom portion 14*b* of the anode block 14 in the direction of where the anode target 13 is installed from the tip nozzle portion 24 of the inner pipe 7*b*. The coolant emitted from the tip nozzle portion 24 flows into the third passage 6*p*3 of the joint 6 through the flow pass composed of the inner surface of the anode block 14 or the inner surface of the outer pipe 7*a* and the outer peripheral portion of the inner pipe 7*b*. The coolant flowing into the third passage 6*p*3 is taken out of the second cooling pipe 5*c* via the second passage 6*p*2.

In addition, in the X-ray tube device 1, when the high-voltage cable is connected to the high-voltage receptacle 4, the tube voltage is applied to the anode target 13. Then, electrons emitted from the cathode 15 collide with the anode target 13, and X-rays are generated. At this time, the anode target 13 is cooled by the coolant flowing through the flow path composed inside the anode block 14. In the coolant flowing through the flow path inside the anode block 14, bubbles are generated by subcooled boiling and cavitation.

Figure 2:
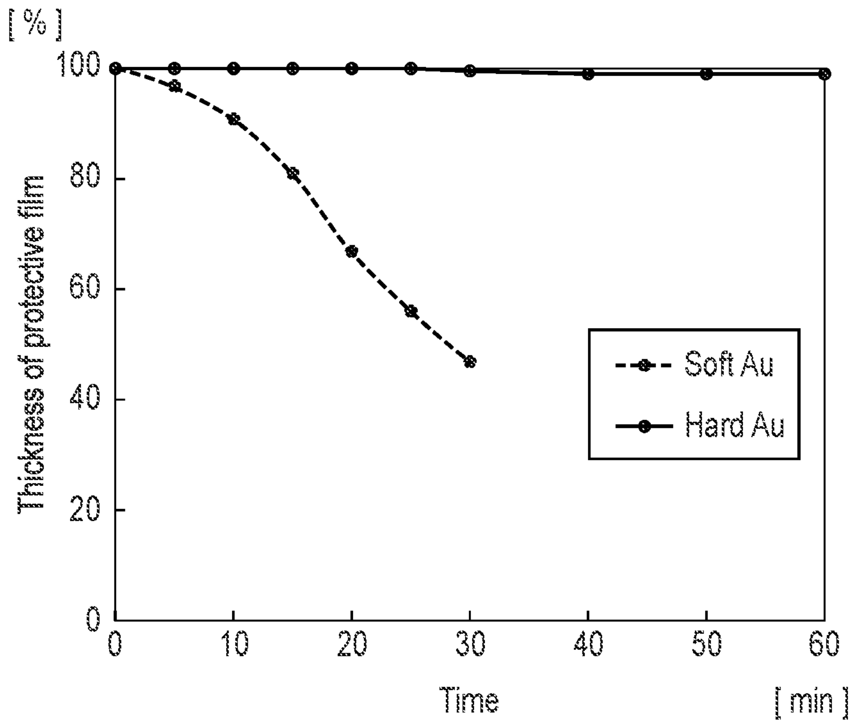
FIG. 2 is a graph showing a change in the thickness of each of a protective film of the embodiment and a protective film of a comparative example with respect to time when each of the protective films is exposed to a coolant.

Next, the counter-corrosion (counter-cavitation) of the protective film PR formed of hard gold (the protective film PR of the present embodiment) and that of a protective film formed of soft gold (a protective film of a comparative example) are compared under the same evaluation conditions. FIG. 2 is a graph showing a change in the thickness of each of the protective films with respect to time when each of the protective films is exposed to the coolant. When the protective film was exposed to the coolant, the change in the protective film with time was tested while the protective film was not only immersed in the coolant but also sprayed with the coolant.

As shown in FIG. 2, the results show that the thickness of the protective film formed of soft gold decreases with time. For example, after 30 minutes, the thickness of the protective film formed of soft gold was substantially reduced to 45%. On the other hand, the results show that the thickness of the protective film PR formed of hard gold hardly changes (decreases). From the above, forming the protective film PR not with soft gold but with hard gold has a significant improvement effect from the perspective of chemically protecting the anode block 14.

According to the X-ray tube device 1 of one embodiment configured as described above, the X-ray tube device 1 comprises the cathode 15, the anode target 13, the first tube portion (outer pipe 7*a* and anode block 14), the second tube portion (inner pipe 7*b*), and the protective film PR covering the inner surface of the anode block 14. Incidentally, boiling cooling of the coolant, pressure difference in the coolant circuit and the like cause bubbles, and the protective film PR is repeatedly subjected to shock waves when the bubbles disappear.

Therefore, if the protective film PR is formed of soft gold, corrosion will occur in the protective film PR. In addition, corrosion and erosion of the protective film PR by the coolant gradually progress, and in the worst case, the coolant may penetrate the anode block 14 and the anode target 13 behind it, and may flow into the X-ray tube 2. It is very difficult to suppress the generation of bubbles in order to prevent the corrosion and erosion of the protective film PR by the coolant.

To solve this, the protective film PR is formed of hard gold in the present embodiment. The hard gold contains gold of greater than or equal to 99 wt %, and cobalt of greater than 0 wt % but less than or equal to 1 wt %. The protective film PR can be obtained by forming a film of hard gold containing cobalt by a plating method. By forming the protective film PR with hard gold having a higher hardness than soft gold, the corrosion and erosion durability of the protective film PR can be improved.

From the above, the X-ray tube device 1 capable of extending the product life can be obtained.

Figure 3:
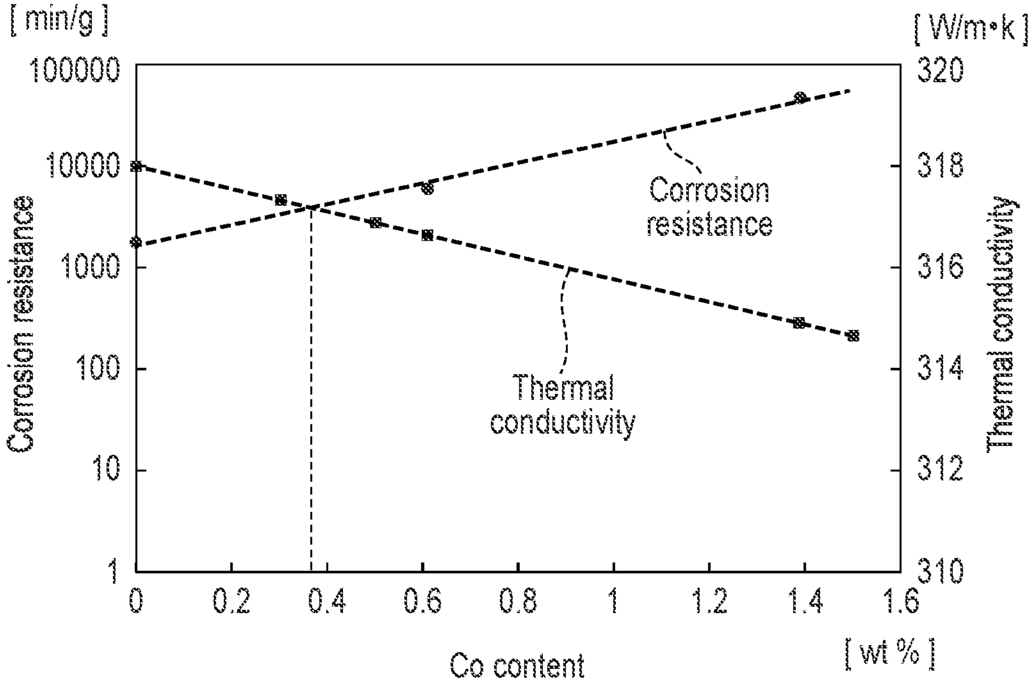
FIG. 3 is a graph showing a change in corrosion resistance and a change in thermal conductivity with respect to a cobalt content in hard gold.

Next, a modification of the above embodiment will be described. FIG. 3 is a graph showing a change in corrosion resistance and a change in thermal conductivity with respect to a cobalt content in hard gold.

As shown in FIG. 3, it can be seen that, as the cobalt content increases in the protective film PR, the hardness of the protective film PR increases, the corrosion resistance improves, and corrosion is less likely to occur. However, it can be seen that, as the cobalt content increases, the thermal conductivity of the protective film PR decreases.

As the thermal conductivity of the protective film PR decreases, the cooling efficiency of the anode block 14 and the anode target 13 decreases, and the surface (target surface) of the anode target 13 easily deteriorates (easily becomes rough). As a result, the product life of the X-ray tube device 1 is shortened, and the product reliability is reduced. From the above, it is preferable that the hard gold should contain cobalt of less than or equal to 0.4 wt %.

When the amount of cobalt added to the hard gold exceeds 0.4 wt %, the thermal conductivity of the protective film PR decreases, the deterioration (roughness) of the surface of the anode target 13 is accelerated, and the probability of not fulfilling the expected (designed) product life of the X-ray tube device 1 increases.

On the other hand, as the amount of cobalt added to the hard gold decreases, the corrosion resistance of the protective film PR gradually decreases, and the corrosion inside the anode block 14 easily progresses. From the above, it is preferable that the hard gold should contain cobalt of greater than or equal to 0.3 wt %.

When the amount of cobalt added to the hard gold is less than 0.4 wt %, the corrosion inside the anode block 14 is accelerated, and the probability of not fulfilling the expected (designed) product life of the X-ray tube device 1 increases.

From the above, it is preferable that the hard gold should contain cobalt in a range of 0.3 to 0.4 wt %.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, as the hard gold used for the protective film PR, metal other than cobalt (Co) may be used as an additive. For example, the hard gold may contain nickel (Ni) of greater than 0 wt %% but less than or equal to 1 wt %. Alternatively, the hard gold may contain chromium (Cr) of greater than 0 wt % but less than or equal to 1 wt %.

What is claimed is:

1. An X-ray tube device comprising:

a cathode which emits electrons;

an anode target which generates X-rays when the electrons emitted from the cathode collide therewith;

a first tube portion having one end portion and another end portion including a bottom portion which is closed and joined to the anode target;

a second tube portion located inside the first tube portion, having a first end portion where an inlet for taking in a coolant is formed and a second end portion which is opposed to the bottom portion and where an outlet for discharging the coolant to the bottom portion is formed, and forming a flow path of the coolant together with the first tube portion; and a protective film covering an inner surface of the first tube portion and formed of hard gold, wherein the hard gold contains gold of greater than or equal to 99 wt %, and any one of cobalt, nickel and chromium of less than or equal to 1 wt %, and the hard gold contains cobalt in a range of 0.3 to 0.4 wt %.

2. The X-ray tube device of claim 1, wherein the coolant is a water-based coolant.

* * * * *